United States Patent
Kim

(10) Patent No.: US 8,977,706 B2
(45) Date of Patent: Mar. 10, 2015

(54) SYSTEM AND METHOD FOR PLAYING BACK CONTENTS BASED ON SMART CARD, AND SMART CARD APPLIED TO THE SAME

(75) Inventor: Seung Hwan Kim, Seongnam-si (KR)

(73) Assignee: SK Planet Co., Ltd., Seoul (KR)

( * ) Notice: Subject to any disclaimer, the term of this patent is extended or adjusted under 35 U.S.C. 154(b) by 187 days.

(21) Appl. No.: 13/132,275

(22) PCT Filed: Jul. 8, 2010

(86) PCT No.: PCT/KR2010/004440
§ 371 (c)(1),
(2), (4) Date: Jun. 1, 2011

(87) PCT Pub. No.: WO2011/031002
PCT Pub. Date: Mar. 17, 2011

(65) Prior Publication Data
US 2011/0246609 A1  Oct. 6, 2011

(30) Foreign Application Priority Data

Sep. 14, 2009  (KR) .......................... 10-2009-0086540

(51) Int. Cl.
*G06F 15/16* (2006.01)
*H04L 29/06* (2006.01)
*H04L 29/08* (2006.01)

(52) U.S. Cl.
CPC .......... *H04L 65/4084* (2013.01); *H04L 65/608* (2013.01); *H04L 67/02* (2013.01)
USPC ............ 709/217; 709/216; 709/218; 709/219

(58) Field of Classification Search
CPC .... H04L 67/02; H04L 65/4084; H04L 65/608
USPC .......................................... 709/217, 218, 219
See application file for complete search history.

(56) References Cited

U.S. PATENT DOCUMENTS

| | | | |
|---|---|---|---|
| 6,493,758 B1 * | 12/2002 | McLain | 709/227 |
| 2007/0014353 A1 * | 1/2007 | Yourlo | 375/240.08 |
| 2007/0136610 A1 * | 6/2007 | Lambinet | 713/193 |
| 2008/0052770 A1 * | 2/2008 | Ali et al. | 726/9 |
| 2010/0030908 A1 * | 2/2010 | Courtemanche et al. | 709/231 |

(Continued)

FOREIGN PATENT DOCUMENTS

| KR | 1020060063004 | 6/2006 |
|---|---|---|
| KR | 10-0597537 | 7/2006 |

(Continued)

OTHER PUBLICATIONS

Korean Notice to File a Response 10-2009-0086540 dated Mar. 28, 2012, citing the above reference(s).

(Continued)

*Primary Examiner* — Dhairya A Patel
(74) *Attorney, Agent, or Firm* — Lowe Hauptman & Ham, LLP

(57) ABSTRACT

Disclosed are a system and a method for playing back contents based on a smart card, and a smart card applied to the same. A browser of a user terminal using a smart card queries a multimedia source of a user existing within the smart card and the multimedia source is played back in real time through the user terminal. A streaming or downloading playback service is provided to provide the user terminal with the multimedia source in real time.

19 Claims, 7 Drawing Sheets

(56) References Cited

U.S. PATENT DOCUMENTS

2010/0281139 A1* 11/2010 Deprun .................. 709/219
2011/0055573 A1* 3/2011 Low et al. ................ 713/172

FOREIGN PATENT DOCUMENTS

| KR | 1020080096740 | 11/2008 |
| KR | 1020080102342 | 11/2008 |
| KR | 1020090046270 | 5/2009 |
| WO | 2009066920 A2 | 5/2009 |
| WO | WO 2009066920 A2 * | 5/2009 ............. H04L 29/08 |

OTHER PUBLICATIONS

Chinese Office Action for 201080019572.4 dated Nov. 25, 2013, citing the above reference(s).

International Search Report for PCT/KR2010/004440, dated Feb. 23, 2011, citing the above reference(s).

* cited by examiner

SYSTEM AND METHOD FOR PLAYING BACK CONTENTS BASED ON SMART CARD, AND SMART CARD APPLIED TO THE SAME

TECHNICAL FIELD

The present invention relates to a technology for playing back contents based on a smart card. More particularly, the present invention relates to a system and a method for playing back contents based on a smart card which provide embedded multimedia contents to a user terminal in a streaming playback manner or a downloading playback manner by utilizing a smart card web server (SCWS) function supporting hypertext transfer protocol (HTTP) and real-time transport protocol (RTP) for real time streaming transmissions.

BACKGROUND

A large capacity Universal Subscriber Identity Module (USIM) card refers to a smart card configured by coupling, for example, a large capacity NAND flash memory to a conventional USIM card in the form of a single chip. The necessities of such large capacity USIM cards are increasing as various operator services (such as a Wireless Internet Platform for Interoperability (WIPI) application) can be mounted in a USIM card and services of a large capacity memory (256 MB or 1 GB or more) can be provided to clients.

In recent years, the concept of a smart card web server (SCWS) has been applied to a smart card mounted to a mobile communication terminal based on a large capacity of the smart card, providing an environment where various service applications can be mounted within a smart card. Such a smart card web server allows various web pages and applications to be driven in a browser of a mobile communication terminal serving as a client.

A large-capacity smart card mounted to a mobile communication terminal provides an environment where such a smart card can be used as a space for storing various contents of a user. In particular, as it becomes possible to store multimedia contents of high capacities, they are required to be inquired and played back through specific applications mounted to a mobile communication terminal.

CONTENTS OF THE INVENTION

Technical Object of the Invention

Accordingly, the present invention has been made to solve the above-mentioned problems occurring in the prior art, and an object of the present invention is to provide a system and a method for playing back contents based on a smart card, and a smart card applied to the same in which an inquiry is made to a browser of a user terminal using a smart card about a multimedia source of a user existing within the smart card and the multimedia source is played back in real time through the user terminal, and a streaming or downloading playback service is provided to provide the user terminal with the multimedia source in real time, improving convenience for a user.

Technical Solution

In order to accomplish the above object, according to one aspect of the present invention, there is provided a system for playing back contents based on a smart card, the system comprising a user terminal configured to request a script file on a smart card for contents to be played back through an embedded browser. The user terminal is also configured to analyze the script file provided from the smart card and to receive the contents to be played back from the smart card through a communication channel classified according to the contents playback manner. The system also comprises a smart card configured to create the script file defining the playback manner of the contents to be played back, wherein the playback manner is according to the request of the user terminal to provide the created scripted file to the user terminal. The smart card is also configured to provide the contents to be played back to the user terminal through the classified communication channel, which is preset according to the contents playback manner. The contents are provided in response to the request for provision of the contents by the user terminal based on the scripted file.

According to another aspect of the present invention, there is provided a user terminal comprising a card interface configured to form a communication channel with a mounted smart card and to provide a connection path to the smart card. The user terminal also comprises a browser configured to request from the smart card a script file of contents to be played back, wherein the contents are stored in the smart card. Additionally, the browser is configured to analyze the script file provided from the smart card to recognize a playback manner of the contents to be played back. The user terminal also comprises a contents player configured to receive the contents to be played back from the smart card through a communication channel, classified according to the recognized playback manner. The contents player is also configured to play back the received contents.

According to a further aspect of the present invention, there is provided a smart card comprising a terminal interface adapted to form a communication channel with a user interface and provide a connection path to a user terminal. The smart card also comprises a streaming server configured to, when receiving a request for transmission of a script file from the user terminal, create the script file defining a playback manner of the stored contents to be played back and provide the created script file to the user terminal. The streaming server is also configured to, when receiving a request for provision of contents based on the script file from the user terminal, provide the contents to be played back through a communication channel preset and classified according to the contents playback manner.

According to a still further aspect of the present invention, there is provided a method for playing back contents based on a smart card, the method comprising the steps of: requesting, by a user terminal, a smart card a script file of contents to be played back through an embedded browser; creating, by a smart card, the script file defining a playback manner of the contents to be played back in response to the request for the script file by the user terminal and providing the created script file to the user terminal; analyzing, by the user terminal, the script file provided by the smart card and checking the contents playback manner; requesting, by the user terminal, the contents to be played back through a communication channel classified according to the contents playback manner; providing, by the smart card, the contents to be played back through the classified communication channel preset according to the contents playback manner in response to the request for provision of the contents by the user terminal based on the script file; and receiving, by the user terminal, the contents to be played back from the smart card and playing back the received contents.

According to a still further aspect of the present invention, there is provided a method for playing back contents based on a smart card, the method comprising the steps of: requesting a script file of contents to be played back which are stored in a smart card; analyzing the script file provided by the smart card and recognizing a playback manner of the contents to be played back; requesting the smart card the contents to be played back through a communication channel classified according to the recognized playback manner; and receiving the contents to be played back from the smart card through the classified communication channel and playing back the received contents.

According to a still further aspect of the present invention, there is provided a method for playing back contents based on a smart card, the method comprising receiving a request for a script file on contents to be played back from a user terminal. The method also comprises creating the script file defining a playback manner of the contents to be played back and providing the created script to the user terminal. The method comprises receiving a request for provision of the contents of the user terminal based on the provided script file and providing the contents to be played back to the user terminal through a communication channel classified according to the contents playback manner.

Advantageous Effects

Therefore, according to the present invention, a system and a method for playing back contents based on a smart card can provide embedded multimedia contents to a user terminal in a streaming playback manner or a downloading playback manner by utilizing a smart card web server (SCWS) function supporting hypertext transfer protocol (HTTP) and real-time transport protocol (RTP) for real time streaming transmissions.

BEST MODES FOR CARRYING OUT THE INVENTION

Hereinafter, exemplary embodiments of the present invention will be described with reference to the accompanying drawings.

Figure 1:
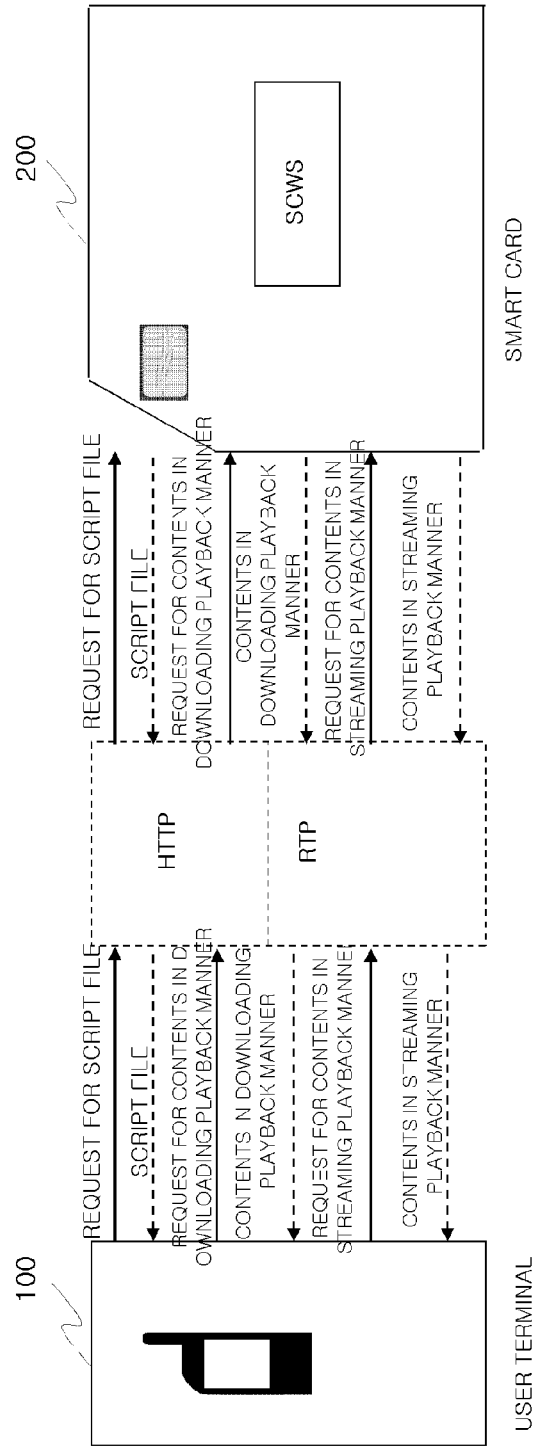
FIG. 1 is a schematic diagram of a system for playing back contents based on a smart card according to an embodiment of the present invention.

FIG. 1 is a schematic diagram of a system for playing back contents based on a smart card according to an embodiment of the present invention.

As illustrated in FIG. 1, the system includes a user terminal 100 adapted to receive contents to be played back from a smart card 200. The smart card 200 is configured to provide the stored contents to be played back to the user terminal 100 based on a function of a smart card web server (SCWS). Here, the smart card web server (SCWS) is a web server realized within the smart card 200, and provides a Servlet container according to the Servlet 2.x and supports real-time transport protocol (RTP) for real-time steaming transmission in addition to HTTP. Based on this fact, the smart card 200 provides a video-on-demand (VOD) streaming server adapted to provide multimedia contents to the user terminal 100 in a streaming manner or a downloading manner in the form of a Servlet application operated in the SCWS.

The user terminal 100 requests, from the smart card 200, the script file of the contents to be played back through an embedded browser. The user terminal 100 analyzes the script file provided by the smart card 200 and receives the contents to be played back from the smart card 200 through a communication channel classified according to the contents playback manner to play back the received contents.

The smart card 200 creates the script file defining the playback manner of the contents to be played back and provides the created script file to the user terminal 100. The smart card 200 creates the script file according to a request by the user terminal 100, and provides the contents to be played back to the user terminal 100 through the classified communication channel preset according to the playback manner of the contents. The user terminal 100, and provides the contents in response to a request for provision of the contents by the user terminal 100 based on the script file.

Then, according to an embodiment of the present invention, when receiving a request for the contents to be played back in a streaming playback manner from the user terminal 100, the smart card 200 can extract the stored contents to be played back and provide the extracted contents in real time through a real-time transport protocol communication channel.

Also, according to an embodiment of the present invention, when receiving a request for the contents to be played back in a downloading playback manner from the user terminal 100 through a HTTP communication channel, the smart card 200 can set a download connection path of the user terminal 100 to a connection address (URL) of the stored contents to be played back.

Hereinafter, the system for playing back contents based on a smart card according to an embodiment of the present invention will be described in more detail.

The user terminal 100 requests, from the smart card 200, a script file of the stored contents to be played back. The user terminal 100 also analyzes the script file provided from the smart card 200 and recognizes the playback manner of the contents to be played back. In more detail, the user terminal 100 requests, from the smart card 200, the script file defining the playback manner of the contents to be played back based on a HTTP connection address (Universal Resource Locator, or URL) of the contents to be played back through an embedded browser. The user terminal 100 analyzes the script file provided by the smart card 200 and recognizes the playback manner of the contents, which are classified according to a streaming playback manner or download playback manner.

In this connection, the user terminal 100 receives the contents to be played back from the smart card 200 through a communication channel, which is classified according to the playback manner of the contents to be played back. In more detail, when the contents are determined to be played back in a streaming playback manner after the analysis of the script file, the user terminal 100 receives the stored contents to be played back from the smart card 200 through a real-time transport protocol (RTP) communication channel and plays back the received contents. Meanwhile, when the contents are determined to be played back in a downloading playback manner after the analysis of the script file, the user terminal 100 connects to a connection address (URL) of the contents stored in the smart card 200 through a HTTP communication channel, and downloads and plays back the contents to be played back.

The smart card 200 creates the script file according to a request for the script file on the contents to be played back by the user terminal 100 through an embedded browser, and provides the created script to the user terminal 100. In more detail, the smart card 200 stores one or more contents whose playback manner is classified based on their connection addresses, and when receiving a request for the script file based on a HTTP connection address (URL) from the user terminal 100 through a HTTP communication channel, the smart card 200 checks the playback manner of the stored content to be played back, creates the script file defining the playback manner, provides the created script file to the user terminal.

In addition, the smart card 200 receives a request for provision of contents by the user terminal 100 based on the provided script file, and provides the contents to be played back through a communication channel classified according to the contents playback manner. In more detail, when receiving a request for contents to be played back in a streaming playback manner from the user terminal 100 through a RTP communication channel, the smart card 200 extracts the stored contents to be played back and provides the extracted contents in real time through a RTP communication channel. Then, it would be preferable to perform a RTP control protocol (RTCP) flow control to provide stable provision of a service when the above-mentioned real-time streaming service is provided. Meanwhile, when receiving a request for contents to be played back in a downloading playback manner from the user terminal 100 through a HTTP communication channel, the smart card 200 sets a download connection path of the user terminal to a connection address (URL) of the stored contents to be played back, and provides a download service.

Figure 2:
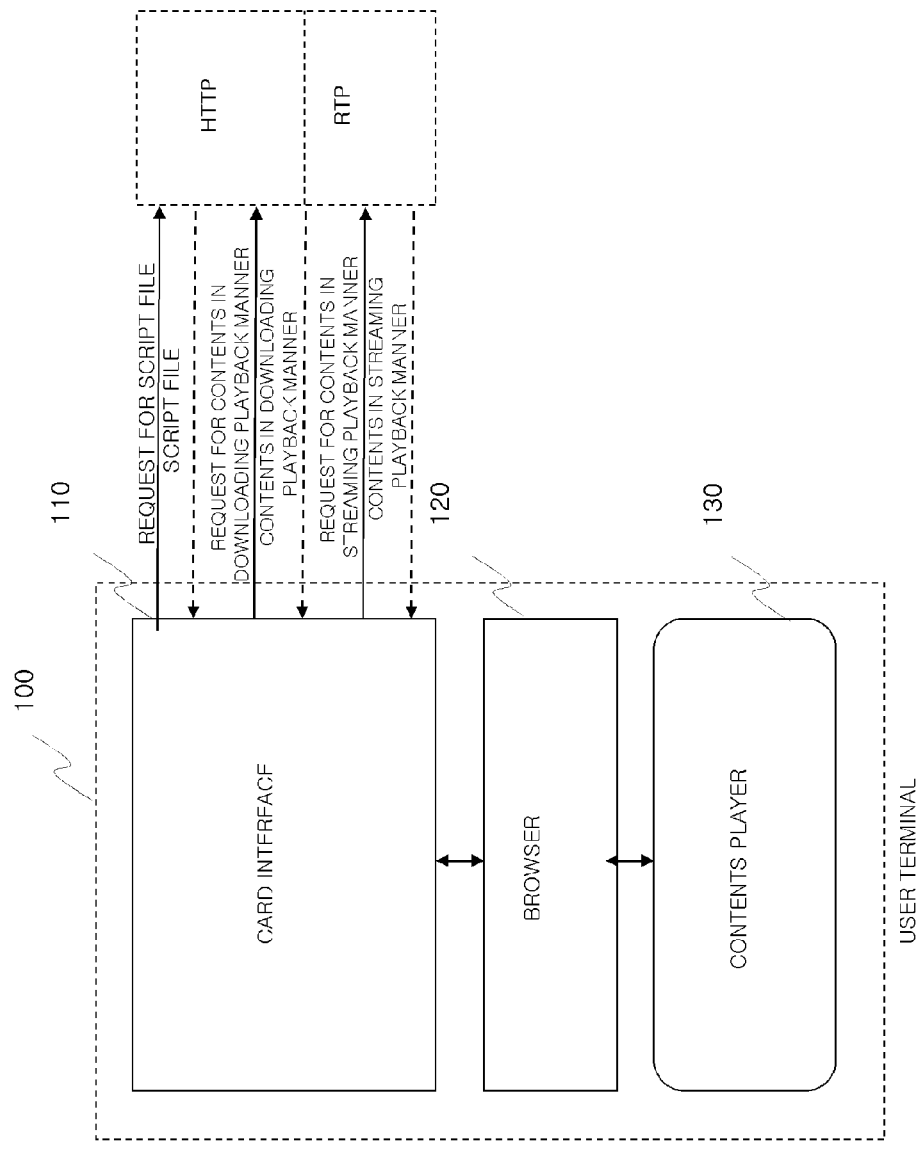
FIG. 2 is a schematic diagram of a user terminal according to an embodiment of the present invention.

Hereinafter, a detailed configuration of the user terminal 100 will be described with reference to FIG. 2. That is, the user terminal 100 includes an interface 110 serving as a card for providing a connection path to the smart card 200; a browser 120 adapted to analyze a script file provided from the smart card 200 and recognize the playback manner of contents to be played back; and a contents player 130 adapted to receive the contents to be played back from the smart card 200 and play back the received contents.

The card interface 110 forms a communication channel with the mounted smart card 200, and provides a connection path to the smart card 200.

The browser 120 requests the smart card 200 a script file of the contents stored in the smart card 200, and analyzes the script file provided by the smart card 200 and recognizes the playback manner of the contents to be played back.

The contents player 130 receives the contents to be played back from the smart card 200 through a communication channel classified according to the recognized playback manner and plays back the received contents.

Then, according to an embodiment of the present invention, the browser 120 can request the smart card 200 the script file defining the playback manner of the contents to be played back based on a HTTP connection address (URL) of the contents to be played back.

Also, according to an embodiment of the present invention, when the playback manner of the contents to be played back is a streaming playback manner, the contents player 130 can receive the contents to be played back in real time through a real-time transport protocol (RTP) communication channel provided by the smart card 200 and plays back the received contents.

Further, according to an embodiment of the present invention, when the playback manner of the contents to be played back is a downloading playback manner, the contents player 130 connects to a connection address (URL) of the stored contents to be played back through a HTTP communication channel provided by the smart card 200.

Hereinafter, the structure of the user terminal according to an embodiment of the present invention will be described in more detail.

The card interface 110 forms a communication channel with the smart card 200, and provides a connection path to the smart card 200. In more detail, the card interface 110 forms a HTTP communication channel and a RTP communication channel with the smart card 100 and provides a connection path to the smart card 200, and, for example, interchip USB (IC USB), Ethernet Emulation Machine (EEM), TCP/IP, and UDP/IP may be hierarchically located at a low level of the communication channel.

The browser requests a script file of the contents stored in the smart card 200, and analyzes the script file provided from the smart card 200 according to the request and recognizes the playback manner of the contents to be played back. In more detail, the browser 120 requests the smart card 200 a script file defining the playback manner of the contents to be played back based on a HTTP connection address (URL) of the contents to be played back through a HTTP communication channel provided by the card interface 110. The browser 120 analyzes a script file provided by the smart card 200, and recognizes the playback manner of the contents classified into a streaming playback manner or a downloading playback manner and requests the contents player 130 driving of the contents.

In this connection, the contents player 130 receives the contents to be played back from the smart card 200 through a communication channel classified according to the playback manner of the contents to be played back and plays back the received contents. In more detail, when the contents are determined to be played back in a streaming playback manner after the analysis of the script file, the contents player 130 receives in real time the stored contents to be played back from the smart card 200 through a real-time transport protocol (RTP) communication channel and plays back the received contents. Meanwhile, when the contents are determined to be played back in a downloading playback manner after the analysis of the script file, the contents player 130 connects a connection address of the stored contents stored in the smart card 200 through a HTTP communication channel, and downloads and plays back the contents to be played back.

Figure 3:
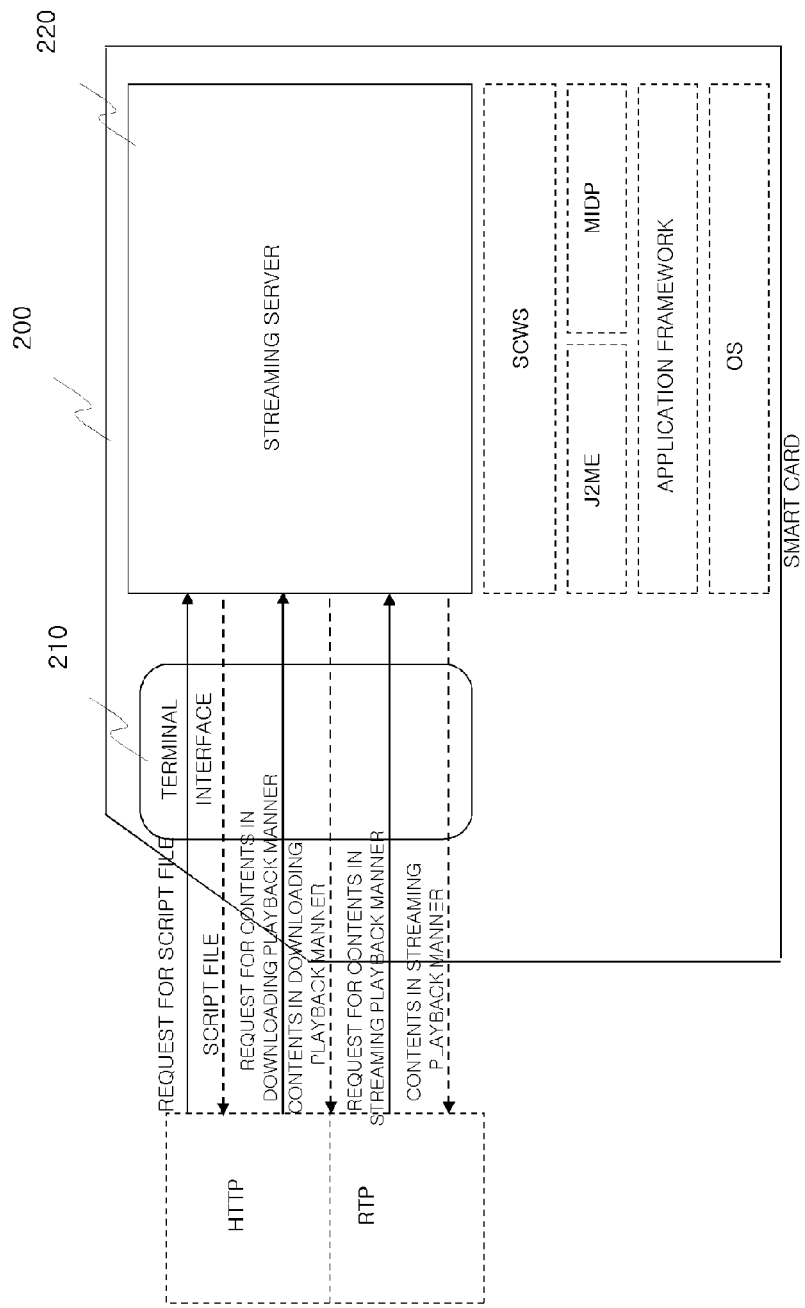
FIG. 3 is a schematic diagram of a smart card according to an embodiment of the present invention.

Hereinafter, a detailed configuration of the smart card 200 will be described with reference to FIG. 3. That is, the smart card 200 includes a terminal interface 210 adapted to form a communication channel with a user terminal and provides a connection path to the smart card; and a streaming server 220 installed based on an SCWS function for providing a Servlet container and providing real-time transport protocol (RTP) for real-time streaming transmission in addition to HTTP, and adapted to provide the contents to be played back through a communication channel preset and classified according to the contents playback manner upon a request for provision of the contents of the user terminal. In addition, the platform included in the smart card 200 is hierarchically configured to include Mobile Information Device Profile (MIDP), JAVA™ 2 Platform, Micro Edition (J2ME), a terminal application framework, and card operation system (OS).

The terminal interface 210 forms a communication channel with the user terminal 100, and provides a connection path to the user terminal 100.

When receiving a request for transmission of a script file from the user terminal, the streaming server 220 creates the script file defining the playback manner of the stored contents to be played back and provides the created script file to the user terminal 100, and when receiving a request for provision of the contents based on the script file from the user terminal 100, the streaming server 220 provides the contents to be played back through a communication channel preset and classified according to the contents playback manner.

Hereinafter, the structure of the smart card 200 according to an embodiment of the present invention will be described in more detail.

The terminal interface 210 forms a communication channel with the user terminal 100, and provides a connection path to the user terminal 100. In more detail, the card interface 100 forms a HTTP communication channel and a RTP communication channel with the smart card 100 and provides a connection path to the user terminal, and, for example, interchip USB (IC USB), Ethernet Emulation Machine (EEM), TCP/IP, and UDP/IP may be hierarchically located at a low level of the communication channel.

The streaming server 220 creates and provides the script file defining the playback manner of the stored contents to be played back according to a request by the user terminal through an embedded browser, and provides the contents to be played back through a communication channel preset and classified according to the contents playback manner upon a request for provision of the contents of the user terminal 100 based on the script file.

Figure 4:
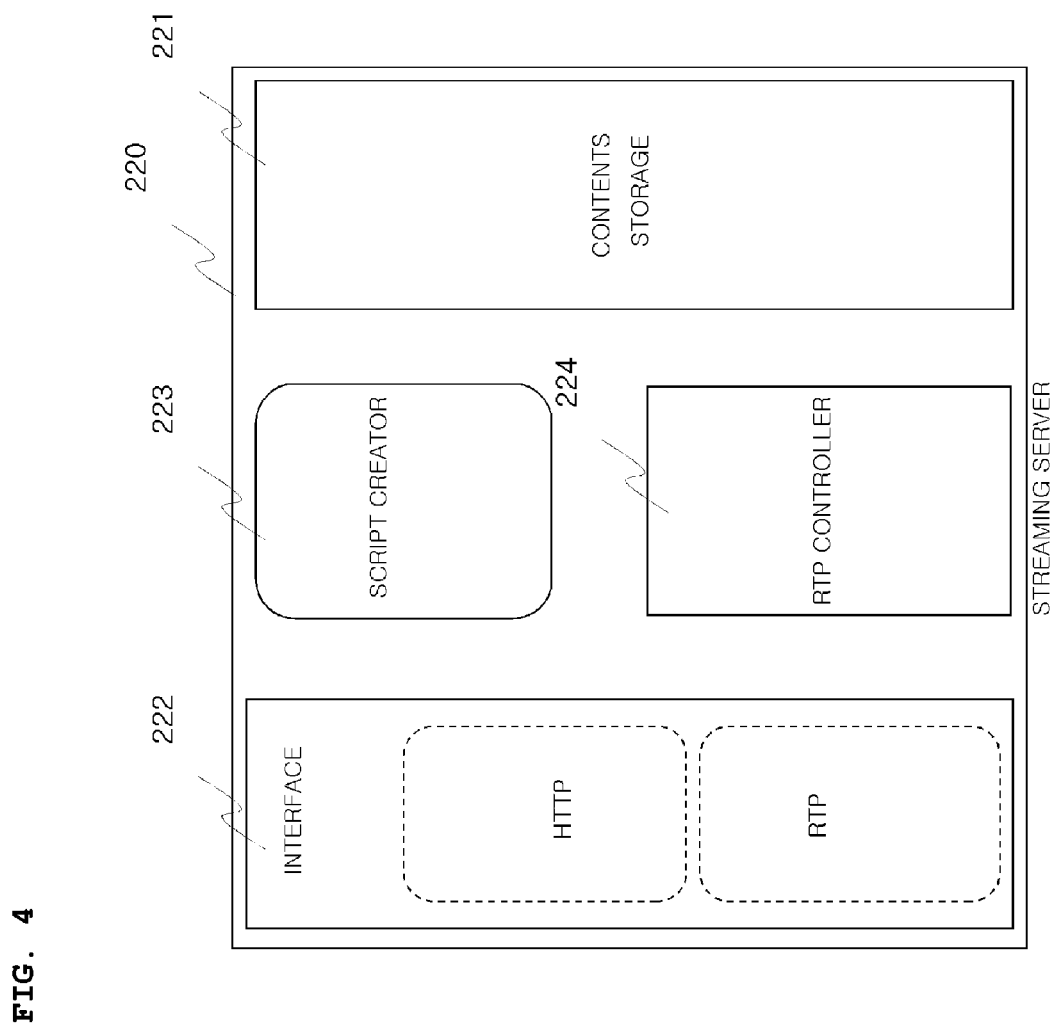
FIG. 4 is a schematic diagram of a streaming server according to an embodiment of the present invention.

For this purpose, as illustrated in FIG. 4, the streaming server 220 includes a content storage 221 adapted to store a plurality of contents which can be played back; an interface 222 adapted to provide a script file on the contents to be played back according to a request of the user terminal 100 and provide the stored contents to be played back according to a request for provision of the contents of the user terminal based on the script file; a script creator 223 adapted to check the playback manner of the contents stored in the content storage 221 according to a request for creation of the script file of the interface 222 and create and provide the script file defining the playback manner; and a RTP controller 224 adapted to perform a RTP control protocol (RTCP) flow control.

The contents storage 221 stores one or more contents classified into a streaming playback manner or a downloading playback manner based on their connection address (URL).

The interface 222 creates a script file according to a request for a script file on the contents of the user terminal 100 through an embedded browser 110 and provides the created script file to the user terminal 100. In more detail, when receiving a request for a script file based on a HTTP connection address (URL) from the user terminal 100, the interface 222 checks storage of the contents to be played back on the contents storage 221 to request that the script creator 223 create the script file, and receives the created script file from the script file creator 223 and provides the received script file to the user terminal 100.

In addition, the interface 222 receives a request for provision of the contents of the user terminal based on the provided script file, and provides the contents to be played back through a communication channel classified according to the playback manner of the contents. In more detail, when receiving a request for the contents to be played back in a streaming playback manner from the user terminal 100 through a RTP communication channel, the interface 222 extracts the stored contents to be played back and provides the extracted contents in real time through the RTP communication channel. Then, it would be preferable to perform a RTP control protocol (RTCP) flow control to provide stable provision of a service when the above-mentioned real-time streaming service is provided. Meanwhile, when receiving a request for contents to be played back in a downloading playback manner from the user terminal 100 through a HTTP communication channel, the interface 222 sets a download connection path of the user terminal to a connection address (URL) of the stored contents to be played back, and provides a download service.

The script creator 223 checks the playback manner of the contents stored in the contents storage 221 and creates the script file defining the playback manner according to a request for creation of the script file, and provides the created script file to the interface 222.

As described above, the system for playing back contents based on a smart card provides a VOD streaming server adapted to provide multimedia contents to the user terminal 100 in a streaming manner or a downloading manner by utilizing a SCWS function providing a Servlet container according to Servlet 2.x and supporting RTP for transmission of real-time streaming in addition to HTTP.

Figure 6:
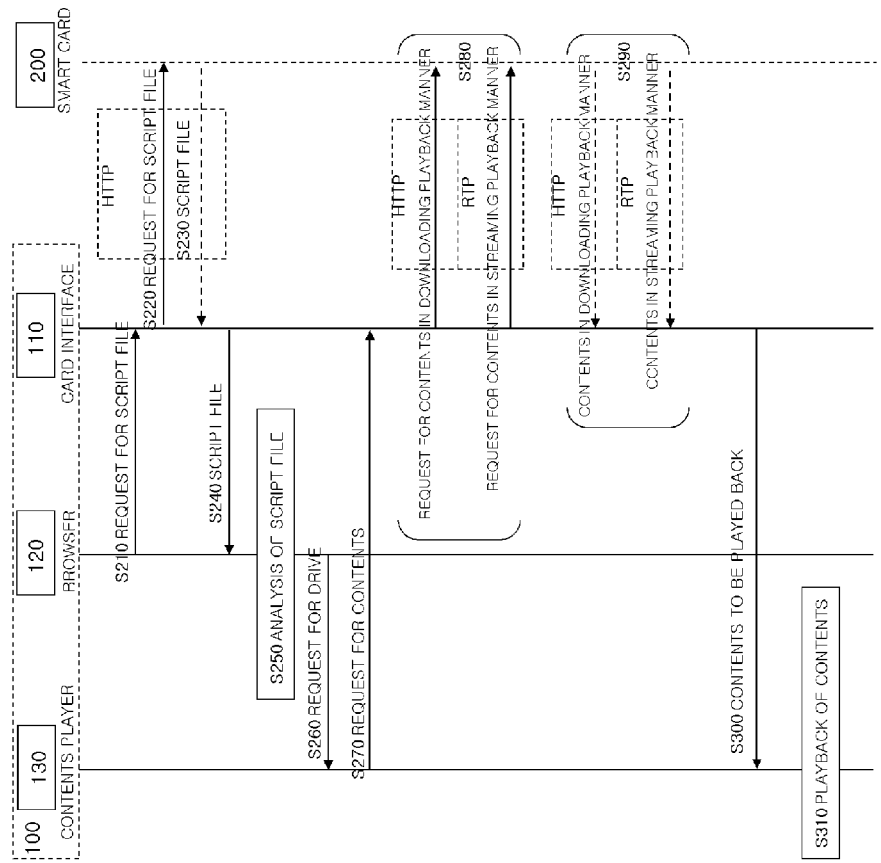
Figure 7:
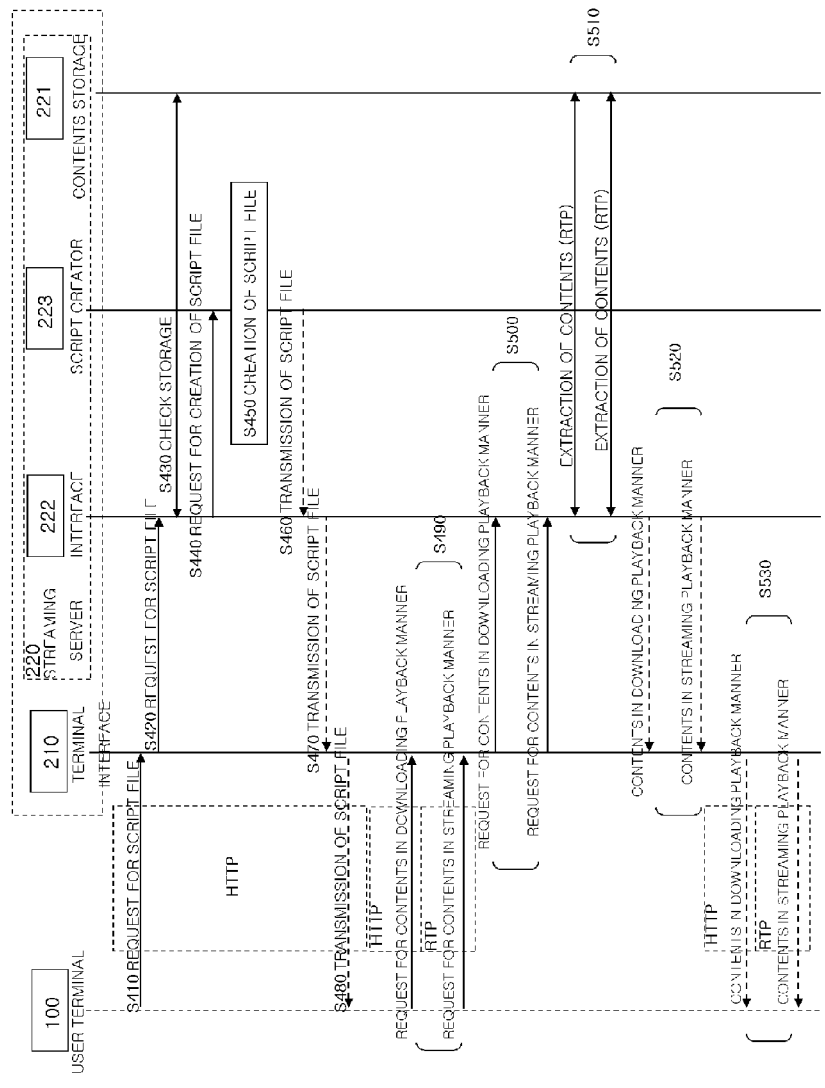

Hereinafter, a method for playing back contents based on a smart card according to an embodiment of the present invention will be described with reference to FIGS. 5 to 7. Here, the configuration of FIGS. 1 to 4 will be described with reference to the reference numerals for the sake of convenience.

First, a driving method of the system for playing back contents based on a smart card according to an embodiment of the present invention will be described with reference to FIG. 5.

Hereinafter, an overall driving method of the system for playing back contents based on a smart card according to an embodiment of the present invention will be described.

The driving method of the system for playing back contents based on a smart card according to an embodiment of the present invention includes the steps of: requesting a smart card 200 a script file of contents to be played back through an embedded browser by a user terminal 100; creating the script file defining the playback manner of the contents to be played back in response to the request for the script file by the user terminal 100 and providing the script file created by the smart card 100; analyzing the script file provided by the smart card 200 and checking the contents playback manner by the user terminal 100; requesting the contents to be played back through a communication channel classified according to the contents playback manner by the user terminal 100; providing the contents to be played back through the classified communication channel preset according to the contents playback manner in response to the request for provision of the contents by the user terminal 100 based on the script file by the smart card 200; and receiving the contents to be played back from the smart card 200 and playing back the received contents by the user terminal 100.

According to an embodiment of the present invention, in requesting a script file, the user terminal can request a script file of the contents stored in the smart card based on a HTTP connection address (URL).

According to an embodiment of the present invention, in providing the contents, the smart card can extract the stored contents to be played back according to a request for the contents to be played back in a streaming playback manner received from the user terminal and provide the extracted contents in real time through a real-time transport protocol (RTP) communication channel.

According to an embodiment of the present invention, in providing the contents, when receiving a request for contents to be played back in a downloading playback manner from the user terminal through a HTTP communication channel, the smart card can set a download connection path of the user terminal to a connection address (URL) of the stored contents to be played back.

Hereinafter, the driving method of the system for playing back contents based on a smart card according to an embodiment of the present invention will be described in more detail.

First, the user terminal 100 requests a script file on the contents stored in the smart card 200 mounted through an embedded browser (S110). Preferably, the user terminal 100 requests the smart card 200 a script file defining the playback manner of the contents to be played back based on a HTTP connection address (URL) of the contents to be played back through an embedded browser.

Then, the smart card 200 creates and provides the script file defining the playback manner of the stored contents to be played back (S120-S130). Preferably, the smart card 200 stores one or more contents whose playback manner is classified based on their connection address (URL), and when receiving a request for the script file based on a HTTP connection address (URL) from the user terminal 100 through a HTTP communication channel, the smart card 200 checks the playback manner of the stored contents to be played back, and creates the script file defining the playback manner and provides the created script to the user terminal 100.

Thereafter, the user terminal 100 analyzes the script file provided by the smart card 200 and checks the contents playback manner (S104). Preferably, the user terminal 100 analyzes the script file provided by the smart card 200, and recognizes the playback manner of the contents classified into a streaming playback manner or a downloading playback manner.

Next, the user terminal 100 requests the contents to be played back through a communication channel classified according to the contents playback manner (S150). Preferably, when the contents are determined to be played back in a streaming playback manner after the analysis of the script file, the user terminal 100 requests the smart card 200 the contents to be played back through a RTP communication channel. Meanwhile, when the contents are determined to be played back in a downloading playback manner after the analysis of the script file, the user terminal 100 requests the smart card 200 the contents to be played back through a RTP communication channel.

Thereafter, the smart card 200 provides the contents to be played back through a communication channel classified according to the playback manner of the contents to be played back upon a request for provision of the contents by the user terminal based on the script file (S160). Preferably, when receiving a request for the contents to be played back in a streaming playback manner from the user terminal 100 through a RTP communication channel, the smart card 200 extracts the stored contents to be played back and provides the extracted contents in real time through a RTP communication channel. Then, it would be preferable to perform a RTP control protocol (RTCP) flow control to provide stable provision of a service when the above-mentioned real-time streaming service is provided. Meanwhile, when receiving a request for contents to be played back in a downloading playback manner from the user terminal 100 through a HTTP communication channel, the smart card 200 sets a download connection path of the user terminal to a connection address (URL) of the stored contents to be played back, and provides a download service.

Next, the user terminal 200 plays back the contents received from the smart card 200 through the classified communication channel (S170). Preferably, the user terminal 200 receives and plays back the contents provided in a streaming manner through a RTP communication channel or in a downloading manner through a HTTP communication channel.

Hereinafter, a method for playing back contents based on a smart card by a user terminal 100 according to an embodiment of the present invention will be described with reference to FIG. 6.

First, an overall process of a method for playing back contents based on a smart card by a user terminal 100 according to an embodiment of the present invention will be described.

The method for playing back contents based on a smart card 200 by a user terminal 100 according to an embodiment of the present invention includes the steps of: requesting a script file of contents to be played back which are stored in a smart card 200; analyzing the script file provided by the smart card 200 and recognizing the playback manner of the contents to be played back; requesting the smart card 200 the contents to be played back through a communication channel classified according to the recognized playback manner; and receiving the contents to be played back from the smart card 200 through the classified communication channel and playing back the received contents.

According to an embodiment of the present invention, in requesting a script file, the script file defining the playback manner of the contents to be played back is requested to the smart card 200 based on a HTTP connection address (URL) of the contents to be played back.

According to an embodiment of the present invention, in playing back the contents, when the playback manner of the contents to be played back is a streaming playback manner, the contents to be played back is received in real time through a real-time transport protocol provided by the smart card 200 and is played back.

According to an embodiment of the present invention, in playing back the contents, when the playback manner of the contents to be played back is a downloading playback manner, a connection address (URL) of the stored contents is connected through a HTTP communication channel provided by the smart card 200 and the contents to be played back is downloaded.

Hereinafter, the method for playing back contents based on a smart card by the user terminal 100 according to an embodiment of the present invention will be described in more detail.

Figure 5:
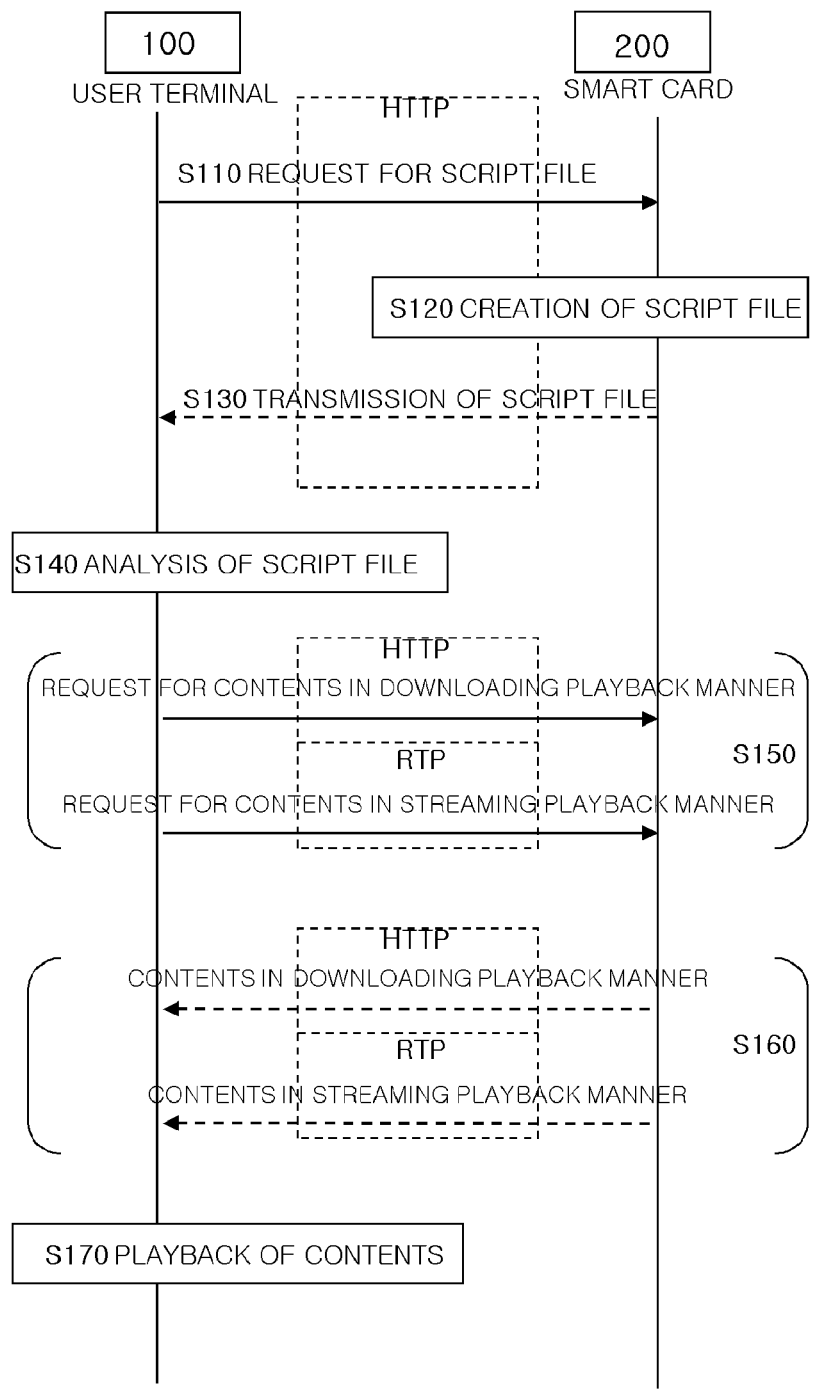
FIGS. 5 to 7 are schematic flowcharts illustrating a method for playing back contents based on a smart card according to an embodiment of the present invention.

First, the user terminal 100 requests a script file of the stored contents to be played back (S210-S220; corresponding to S110 of FIG. 5). Preferably, the browser 120 requests the smart card 200 a script file defining the playback manner of the contents to be played back based on a HTTP connection address (URL) of the contents to be played back through a HTTP communication channel provided by the card interface 110.

Thereafter, the user terminal analyzes a script file provided by the smart card 200 and recognizes the playback manner of the contents to be played back (S230-S260; corresponding to S120-S140 of FIG. 5). Preferably, the browser 120 analyzes a script file provided by the smart card 200, and recognizes the playback manner of the contents classified into a streaming playback manner or a downloading playback manner and requests the contents player 130 driving of the contents.

Next, the user terminal 100 requests the smart card 200 the contents to be played back through a communication channel classified according to the recognized playback manner (S270-S280; corresponding to S150 of FIG. 5). Preferably, when the contents are determined to be played back in a streaming playback manner after the analysis of the script file, the contents player 130 requests the smart card 200 the contents to be played back through a RTP communication channel. Meanwhile, when the contents are determined to be played back in a downloading playback manner after the analysis of the script file, the contents player 130 requests the smart card 200 the contents to be played back through a HTTP communication channel.

Next, the user terminal 100 receives the contents to be played back from the smart card 200 through the classified communication channel and plays back the received contents (S290-S310; corresponding to S160-S170 of FIG. 5). Preferably, the contents player 130 receives the contents to be played back in a streaming playback manner in real time from the smart card 200 through a RTP communication channel and plays back the received contents. Meanwhile, the contents player 130 connects to a connection address (URL) of the contents stored in the smart card 200 through a HTTP communication channel, and downloads and plays back the contents to be played back.

Hereinafter, a method for playing back contents based on a smart card by a smart card 200 according to an embodiment of the present invention will be described.

The method for playing back contents based on a smart card by a smart card 200 according to an embodiment of the present invention will be described and includes the steps of: receiving a request for a script file on contents to be played back from a user terminal 100; creating the script file defining the playback manner of the contents to be played back and providing the created script to the user terminal 100; receiving a request for provision of the contents of the user terminal 100 based on the provided script file; and providing the contents to be played back to the user terminal 100 through a communication channel classified according to the contents playback manner.

According to an embodiment of the present invention, in requesting a script file, a request for a script file on the contents to be played back based on a HTTP connection address (URL) through a HTTP communication channel can be received.

According to an embodiment of the present invention, in providing the contents, when a request for the contents to be played back in a streaming playback manner from the user terminal 100 is received, the stored contents to be played back can be extracted and provided through a real-time transport protocol (RTP) communication channel.

According to an embodiment of the present invention, in providing the contents, when a request for the contents to be played back in a downloading playback manner from the user terminal 100 through a HTTP communication channel is received, a download connection path of the user terminal 100 is set to a connection address (URL) of the stored contents to be played back.

Hereinafter, the method for playing back contents based on a smart card by the smart card according to an embodiment of the present invention will be described in more detail.

First, the smart card 200 receives a request for a script file on the contents of the user terminal 100 through an embedded browser (S410-S440; corresponding to S110 of FIG. 5). Preferably, when receiving a request for a script file based on a HTTP connection address (URL) from the user terminal 100 through a HTTP communication channel, the interface 222 checks storage of the contents to be played back on the content storage 221 and requests the script creator 223 creation of the script file.

Thereafter, the smart card 200 creates the script file defining the playback manner of the stored contents to be played back and provides the created script to the user terminal 100 (S450-S480; corresponding to S150 of FIG. 5). Preferably, the interface 222 receives the script file defining the playback manner of the contents to be played back from the script creator 223 and provides the received contents to the user terminal 100.

Next, the smart card 220 receives a request for the contents of the user terminal 100 based on the provided script file (S490-S500; corresponding to S160 of FIG. 5). Preferably, the interface 222 receives a request for the contents to be played back in a streaming playback manner from the user terminal 100 through a RTP communication channel. Otherwise, the interface 222 receives a request for the contents to be played back in a streaming playback manner from the user terminal 100 through a HTTP communication channel.

Thereafter, the smart card provides the contents to be played back to the user terminal 100 through a communication channel classified according to the playback manner of the contents (S510-S530; corresponding to S120-S150 of FIG. 5). Preferably, when receiving a request for the contents to be played back in a streaming playback manner from the user terminal 100 through a RTP communication channel, the interface 222 extracts the stored contents to be played back in real time through a RTP communication channel. Then, it would be preferable to perform a RTP control protocol (RTCP) flow control to provide stable provision of a service when the above-mentioned real-time streaming service is provided. Meanwhile, when receiving a request for contents to be played back in a downloading playback manner from the user terminal 100 through a HTTP communication channel, the interface 222 sets a download connection path of the user terminal to a connection address (URL) of the stored contents to be played back, and provides a download service.

As described above, the system for playing back contents based on a smart card provides a VOD streaming server adapted to provide multimedia contents to the user terminal 100 in a streaming manner or a downloading manner by utilizing a SCWS function providing a Servlet container according to Servlet 2.x and supporting RTP for transmission of real-time streaming in addition to HTTP.

The method and steps of the algorithm described above related to the embodiments of the present invention may be realized in the form of hardware, software executed by a processor, or a combination of the hardware and software. The software module may reside in a storage medium, such as a RAM memory, a flash memory, a ROM memory, an EPROM memory, an EEPROM memory, registers, a hard disc, a mobile disc, a CD-ROM, or other storage devices generally known in the art. The storage medium is connected to the processor, so that the processor may read information from the storage medium or record the information onto the storage medium. Alternatively, the storage medium can be integrated in the processor. The processor and the storage medium may be included in an ASIC. The ASIC may be included in the terminal. Alternatively, the processor and the storage medium may serve as components of the terminal.

Although exemplary embodiments of the present invention have been described, it is understood that the present invention should not be limited to these exemplary embodiments but various changes and modifications can be made by a person with ordinary skill in the art within the spirit and scope of the present invention as hereinafter claimed.

INDUSTRIAL APPLICABILITY

According to the present invention, the system and method for playing back contents based on a smart card can provide embedded multimedia contents to a user terminal in a streaming playback manner or a downloading playback manner by utilizing a smart card web server (SCWS) function supporting hypertext transfer protocol (HTTP) and real-time transport protocol (RTP) for real time streaming transmission, thereby overcoming the disadvantages of conventional technologies and making it possible to distribute devices to which the present invention is applied. Thus, it is apparent that the present invention can be carried out and is industrially applicable.

The invention claimed is:

1. A system for playing back contents based on a smart card, the system comprising:
a user terminal comprising a user terminal processor, configured to
request, from a smart card, a script file of contents to be played back through an embedded browser,
analyze the script file transmitted from the smart card, and
receive the contents to be played back from the smart card through a communication channel, wherein the contents are selected according to a contents playback manner; and
the smart card comprising a smart card processor, configured to
create the script file according to the request of the user terminal,
transmit the created script file to the user terminal, and
transmit the contents to be played back to the user terminal through the communication channel in response to a contents request for the contents from the user terminal based on the script file,
wherein the script file defines the contents playback manner for the contents to be played back,
wherein the communication channel is preset according to the contents playback manner, and
wherein the smart card includes a Smart Card Web Server (SCWS) which provides a servlet container and a function for playing back the contents, and the smart card is further configured to transmit the contents in a form of a servlet application operated in the SCWS by using the provided servlet container, and
wherein the smart card includes a video-on-demand (VOD) streaming server configured to provide multimedia contents to the user terminal in a streaming manner or a downloading manner in a form of the servlet application operated in the SCWS,
wherein when receiving the contents request for the contents to be played back in a downloading playback manner from the user terminal through a hypertext transfer protocol (HTTP) communication channel, the smart card is configured to set a download connection path for the user terminal to a connection address of the contents to be played back stored in the smart card.

2. The system of claim 1, wherein when receiving the contents request for the contents to be played back in a streaming playback manner from the user terminal, the smart card is configured to extract the contents to be played back stored in the smart card and transmit the extracted contents in real time through a real-time transport protocol (RTP) communication channel.

3. A user terminal, comprising:
a user terminal processor;
a card interface configured to form a communication channel with a smart card mounted in the card interface, wherein the smart card comprises a smart card processor;
a browser configured to
request, from the smart card, a script file of contents which are stored in the smart card and to be played back, and
analyze the script file transmitted from the smart card to recognize a contents playback manner for the contents to be played back; and
a contents player configured to receive the contents to be played back from the smart card through the communication channel and play back the received contents, wherein the communication channel is classified according to the recognized contents playback manner,
wherein the smart card includes a Smart Card Web Server (SCWS) which provides a servlet container and a function for playing back the contents, and the smart card is further configured to transmit the contents in a form of a servlet application operated in the SCWS by using the provided servlet container, and
wherein the smart card includes a video-on-demand (VOD) streaming server configured to provide multimedia contents to the user terminal in a streaming manner or a downloading manner in a form of the servlet application operated in the SCWS,
wherein the browser is configured to request the script file, which defines the contents playback manner for the contents to be played back, based on a hypertext transfer protocol (HTTP) connection address of the contents to be played back.

4. The user terminal of claim 3, wherein when the contents playback manner is a streaming playback manner, the contents player is configured to receive the contents to be played back in real time through a real-time transport protocol (RTP) communication channel provided by the smart card and play back the received contents.

5. The user terminal of claim 3, wherein when the contents playback manner is a downloading playback manner, the contents player is configured to connect to a connection address of the contents to be played back stored in the smart card through a HTTP communication channel provided by the smart card and download the contents to be played back.

6. A smart card, comprising:
a smart card processor;
a terminal interface configured to form a communication channel with a user interface; and
a streaming server configured to
when receiving a request for transmission of a script file from a user terminal comprising a processor, create the script file which defines a contents playback manner for stored contents in the smart card,
transmit the created script file to the user terminal, and
when receiving a contents request for the contents based on the script file from the user terminal, transmit the contents through the communication channel, which is preset and classified according to the contents playback manner,
wherein the smart card includes a Smart Card Web Server (SCWS) which provides a servlet container and a function for playing back the contents, and the smart card is further configured to transmit the contents in a form of a servlet application operated in the SCWS by using the provided servlet container, and
wherein the streaming server of the smart card includes a video-on-demand (VOD) streaming server configured to provide multimedia contents to the user terminal in a streaming manner or a downloading manner in a form of the servlet application operated in the SCWS, wherein the streaming server includes:
a contents storage configured to store one or more contents, wherein the contents playback manner is classified based on connection addresses;
an interface configured to
transmit the created script file to the user terminal in response to the request for the script file of the user terminal,
receive the contents request for the contents from the user terminal based on the script file, and
transmit the contents through the communication channel; and
a script creator configured to check the contents playback manner for the stored contents stored in the contents storage, create the script file, and transmit the created script file to the interface, and
wherein the interface of the streaming server configured to
check the contents storage in response to the request for the script file which is transmitted from the user terminal through a hypertext transfer protocol (HTTP) according to a hypertext transfer protocol (HTTP) connection address, and
request the script creator to create the script file.

7. The smart card of claim 6, wherein when receiving the contents request for contents to be played back in a streaming playback manner from the user terminal, the interface of the streaming server is configured to extract the contents from the stored contents in the contents storage and transmit the extracted contents in real time through a real-time transport protocol (RTP) communication channel.

8. The smart card of claim 6, wherein when receiving the contents request for contents to be played back in a downloading playback manner from the user terminal through a HTTP communication channel, the interface of the streaming server is configured to set a download connection path for the user terminal to a connection address of the stored contents to be played back.

9. A method for playing back contents based on a smart card, the method comprising:
requesting, by a user terminal and from a smart card, a script file of contents to be played back through an embedded browser;
creating, by the smart card, the script file, which defines a contents playback manner for the contents to be played back, in response to the request of the user terminal;
transmitting, by the smart card, the created script file to the user terminal;
analyzing, by the user terminal, the script file transmitted by the smart card;
checking, by the user terminal, the contents playback manner;
requesting, by the user terminal, the contents to be played back through a communication channel classified according to the contents playback manner;
transmitting, by the smart card, the contents to be played back through the classified communication channel, in response to the request from the user terminal for the contents, wherein the request is based on the script file;
receiving, by the user terminal, the contents to be played back from the smart card; and
playing back, by the user terminal, the received contents,
wherein the smart card includes a Smart Card Web Server (SCWS) which provides a servlet container and a function for playing back the contents, and the transmitting the contents comprises transmitting the contents in a form of a servlet application operated in the SCWS by using the provided servlet container, and
wherein the smart card includes a video-on-demand (VOD) streaming server configured to provide multimedia contents to the user terminal in a streaming manner or a downloading manner in a form of the servlet application operated in the SCWS,
wherein in transmitting the contents, when receiving the request for contents to be played back in a downloading playback manner from the user terminal through a HTTP communication channel, the smart card sets a download connection path for the user terminal to a connection address of the contents to be played back stored in the smart card.

10. The method of claim 9, wherein in requesting the script file, the user terminal requests the script file of the contents stored in the smart card based on a hypertext transfer protocol (HTTP) connection address.

11. The method of claim 9, wherein in transmitting the contents, the smart card extracts the contents to be played back from stored contents in the smart card according to the request from the user terminal for the contents to be played back in a streaming playback manner and transmits the extracted contents in real time through a real-time transport protocol (RTP) communication channel.

12. A method for playing back contents based on a smart card, the method performed by a user terminal and comprising:
requesting a script file of contents to be played back which are stored in the smart card;
receiving the script file from the smart card;
analyzing the received script file;
recognizing a contents playback manner for the contents to be played back;
requesting the smart card to transmit the contents to be played back through a communication channel classified according to the recognized contents playback manner;
receiving the contents to be played back from the smart card through the classified communication channel; and
playing back the received contents,
wherein the smart card includes a Smart Card Web Server (SCWS) which provides a servlet container and a function for playing back the contents, and the receiving the contents comprises receiving the contents which are transmitted from the smart card in a form of a servlet application operated in the SCWS by using the provided servlet container, and
wherein the streaming server of the smart card includes a video-on-demand (VOD) streaming server configured to provide multimedia contents to the user terminal in a streaming manner or a downloading manner in a form of the servlet application operated in the SCWS,
wherein when the contents playback manner is a downloading playback manner, in the receiving the contents, the user terminal connects to a connection address of the contents to be played back stored in the smart card through a HTTP communication channel provided by the smart card and downloads the contents to be played back.

13. The method of claim 12, wherein in the requesting the script file, the user terminal requests the script file, which defines the contents playback manner for the contents to be played back, based on a hypertext transfer protocol (HTTP) connection address of the contents to be played back.

14. The method of claim 13, wherein when the contents playback manner is a streaming playback manner, in the receiving the contents, the user terminal receives the contents to be played back in real time through a real-time transport protocol provided by the smart card.

15. A method for playing back contents based on a smart card, the method performed by the smart card and comprising:
   receiving a request for a script file regarding contents to be played back from a user terminal;
   creating the script file which defines a contents playback manner for the contents to be played back;
   transmitting the created script file to the user terminal;
   receiving a request, from the user terminal, for the contents based on the transmitted script file; and
   transmitting the contents to be played back to the user terminal through a communication channel classified according to the contents playback manner,
   wherein the smart card includes a SCWS (Smart Card Web Server) which provides a servlet container and a function for playing back contents, and the transmitting the contents comprises transmitting the contents in a form of a servlet application operated in the SCWS by using the provided servlet container, and
   wherein the smart card includes a video-on-demand (VOD) streaming server configured to provide multimedia contents to the user terminal in a streaming manner or a downloading manner in a form of the servlet application operated in the SCWS,
   wherein when receiving a request for the contents to be played back in a downloading playback manner from the user terminal through an HTTP communication channel, in the transmitting the contents, the smart card sets a download connection path for the user terminal to a connection address of the stored contents to be played back.

16. The method of claim 15, wherein in the receiving the request for the script file, the smart card receives the request for the script file through an HTTP communication channel, based on a hypertext transfer protocol (HTTP) connection address.

17. The method of claim 15, wherein when receiving the request for the contents to be played back in a streaming playback manner from the user terminal, in the transmitting the contents, the smart card extracts the contents to be played back from stored contents in the smart card, and transmits the extracted contents in real time through a real-time transport protocol (RTP) communication channel.

18. A non-transitory computer-readable medium having instructions embodied thereon for, when executed by at least one processing device, causing the at least one processing device to perform a method of playing back contents based on a smart card, the method comprising:
   requesting a script file of contents to be played back which are stored in the smart card;
   analyzing the script file transmitted from the smart card;
   recognizing a contents playback manner for the contents to be played back;
   requesting the smart card to transmit the contents to be played back through a communication channel classified according to the recognized contents playback manner;
   receiving the contents to be played back from the smart card through the classified communication channel; and
   playing back the received contents,
   wherein the smart card includes a Smart Card Web Server (SCWS) which provides a servlet container and a function for playing back the contents, and the receiving the contents comprises receiving the contents which are transmitted from the smart card in a form of a servlet application operated in the SCWS by using the provided servlet container, and
   wherein the smart card includes a video-on-demand (VOD) streaming server configured to provide multimedia contents to the user terminal in a streaming manner or a downloading manner in a form of the servlet application operated in the SCWS,
   wherein when the contents playback manner is a downloading playback manner, in the receiving the contents, the user terminal connects to a connection address of the contents to be played back stored in the smart card through a HTTP communication channel provided by the smart card and downloads the contents to be played back.

19. A non-transitory computer-readable recording medium having instructions embodied thereon for, when executed by a smart card, causing the smart card to implement a method for playing back contents based on the smart card, the method comprising:
   receiving a request for a script file regarding contents to be played back from a user terminal;
   creating the script file which defines a contents playback manner for the contents to be played back;
   transmitting the created script file to the user terminal;
   receiving a request, from the user terminal, for the contents based on the transmitted script file; and
   transmitting the contents to be played back to the user terminal through a communication channel classified according to the contents playback manner,
   wherein the smart card includes a Smart Card Web Server (SCWS) which provides a servlet container and a function for playing back the contents, and the transmitting the contents comprises transmitting the contents in a form of a servlet application operated in the SCWS by using the provided servlet container, and
   wherein the smart card includes a video-on-demand (VOD) streaming server configured to provide multimedia contents to the user terminal in a streaming manner or a downloading manner in a form of the servlet application operated in the SCWS,
   wherein when receiving a request for the contents to be played back in a downloading playback manner from the user terminal through an HTTP communication channel, in the transmitting the contents, the smart card sets a download connection path for the user terminal to a connection address of the stored contents to be played back.

* * * * *